United States Patent
Diehl et al.

(10) Patent No.: US 8,210,315 B2
(45) Date of Patent: Jul. 3, 2012

(54) COMPONENT ASSEMBLY COMPRISING A SHEET METAL PART AND A NUT ELEMENT ATTACHED THERETO AND ALSO A METHOD FOR THE MANUFACTURE OF SUCH A COMPONENT ASSEMBLY

(75) Inventors: Oliver Diehl, Bad Homburg (DE); Michael Vieth, Bad Vilbel (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 558 days.

(21) Appl. No.: 12/393,447

(22) Filed: Feb. 26, 2009

(65) Prior Publication Data

US 2009/0218168 A1  Sep. 3, 2009

(30) Foreign Application Priority Data

Feb. 29, 2008 (DE) .......... 10 2008 011 794
Mar. 26, 2008 (DE) .......... 10 2008 015 711

(51) Int. Cl.
*F16C 3/14* (2006.01)
*F16N 33/00* (2006.01)
*F16B 37/04* (2006.01)
(52) U.S. Cl. .......... 184/1.5; 411/180
(58) Field of Classification Search .......... 184/1.5
See application file for complete search history.

(56) References Cited

U.S. PATENT DOCUMENTS

| 1,872,385 A | | 8/1932 | Andren |
| 3,754,677 A | * | 8/1973 | Hug .......... 220/288 |
| 4,708,556 A | * | 11/1987 | Pamer et al. .......... 411/179 |
| 5,251,370 A | | 10/1993 | Muller et al. |
| 5,335,411 A | * | 8/1994 | Muller et al. .......... 29/512 |
| 5,528,812 A | | 6/1996 | Muller |
| 5,547,042 A | * | 8/1996 | Platt .......... 184/1.5 |
| 5,782,594 A | | 7/1998 | Muller |
| 2001/0010789 A1 | * | 8/2001 | Pamer et al. .......... 411/179 |
| 2002/0159858 A1 | * | 10/2002 | Ikami et al. .......... 411/181 |

FOREIGN PATENT DOCUMENTS

| DE | 1776791 U | 10/1958 |
| EP | 0 539 793 B1 | 5/1993 |
| EP | 0 759 510 B1 | 2/1997 |
| EP | 0 957 273 B1 | 11/1999 |
| EP | 1 116 891 B1 | 7/2001 |

OTHER PUBLICATIONS

English language translation of German Search Report dated Apr. 19, 2010 relating to German Patent Application No. 10 2008 015 711.2.

* cited by examiner

*Primary Examiner* — Michael Mansen
*Assistant Examiner* — Henry Liu
(74) *Attorney, Agent, or Firm* — Eugene C. Rzucidlo; Hershkovitz & Associates, LLC

(57) ABSTRACT

A component assembly comprising a sheet metal part and a nut element attached thereto, the nut element being arranged in an opening of the sheet metal part and being adapted to receive a bolt element having a shaft part with a thread and a head part of larger radial dimensions is wherein the sheet metal part has at least one hole adjacent to the nut element which is not covered over by the nut element but can be covered over by the head part of the screwed-in bolt element. A component assembly of this kind is in particular suitable for an oil pan since the oil can flow through the holes. A method is also claimed.

2 Claims, 15 Drawing Sheets

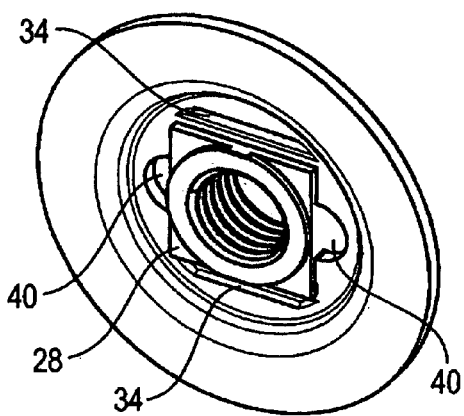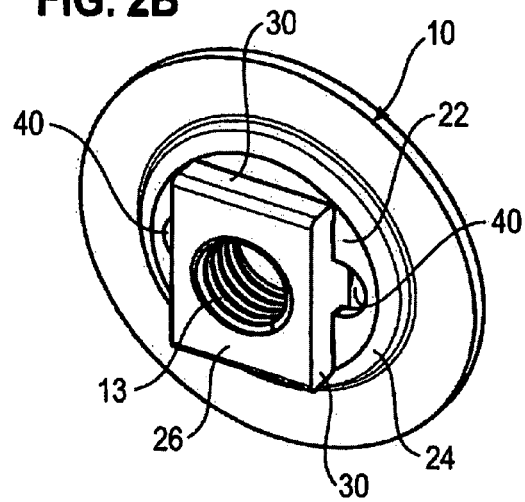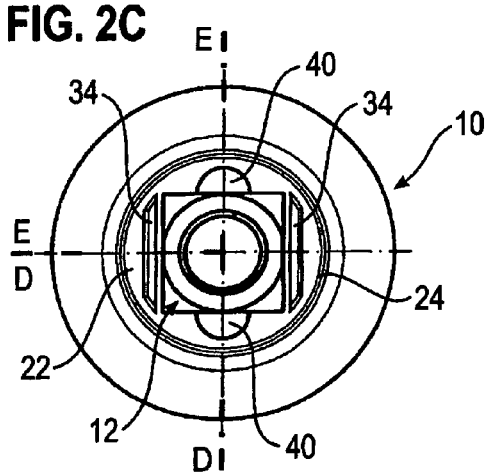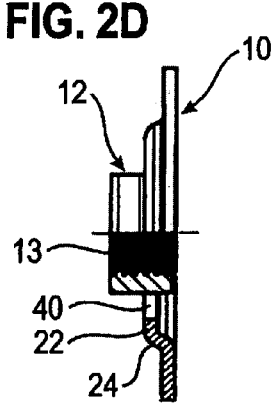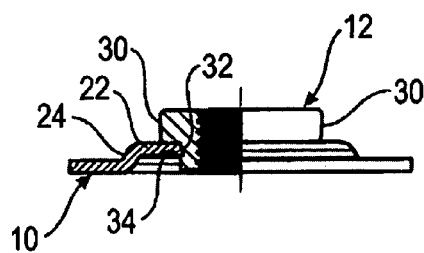

Figure 1A:
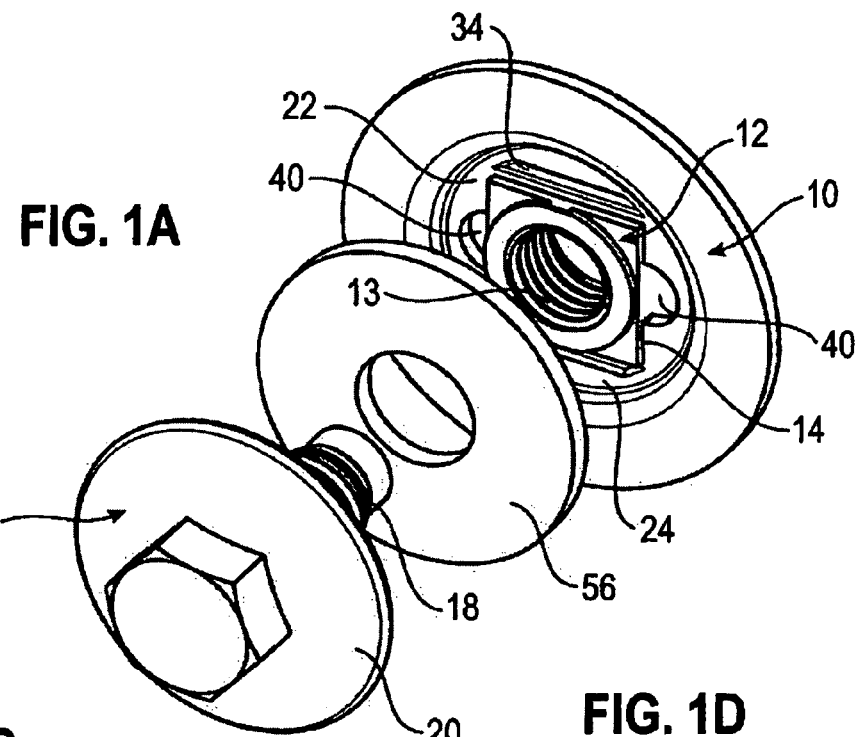

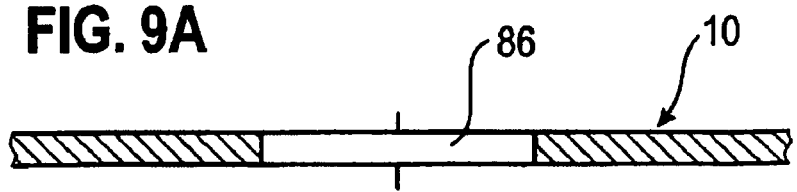
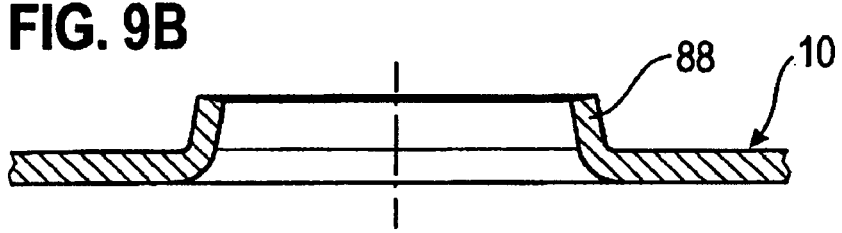
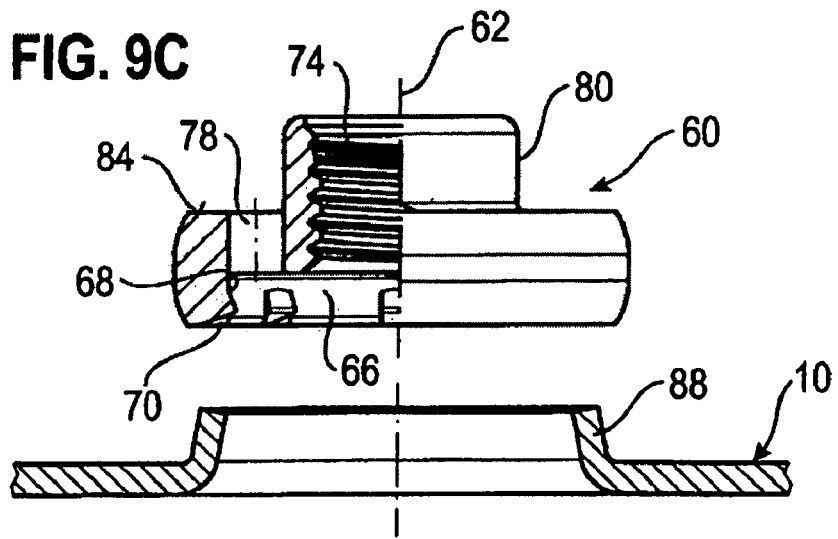
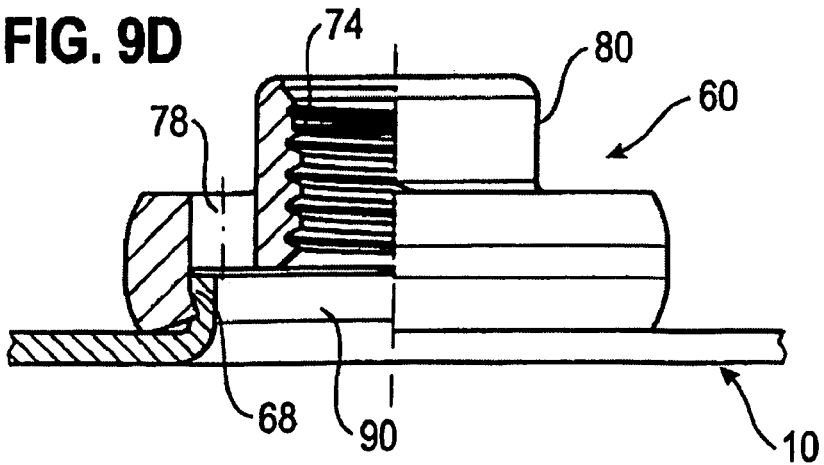

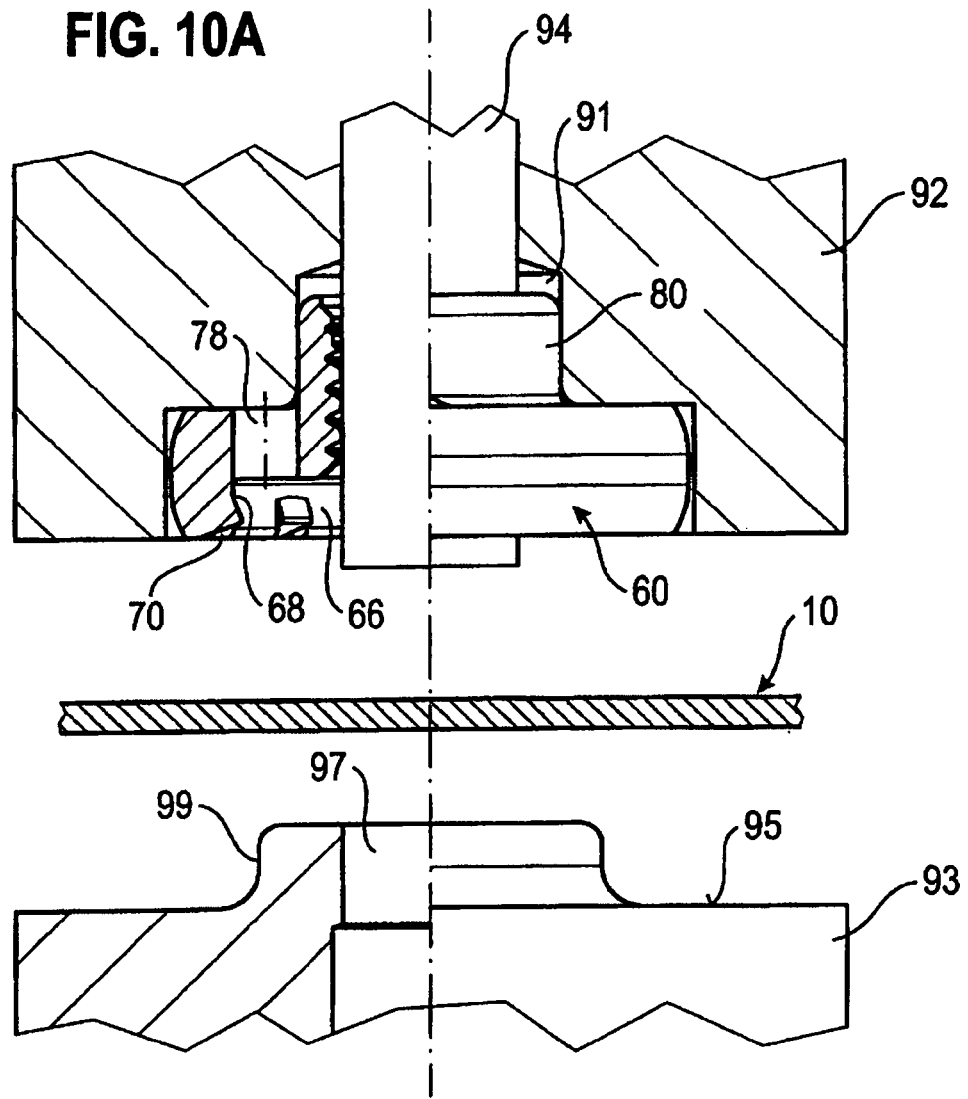
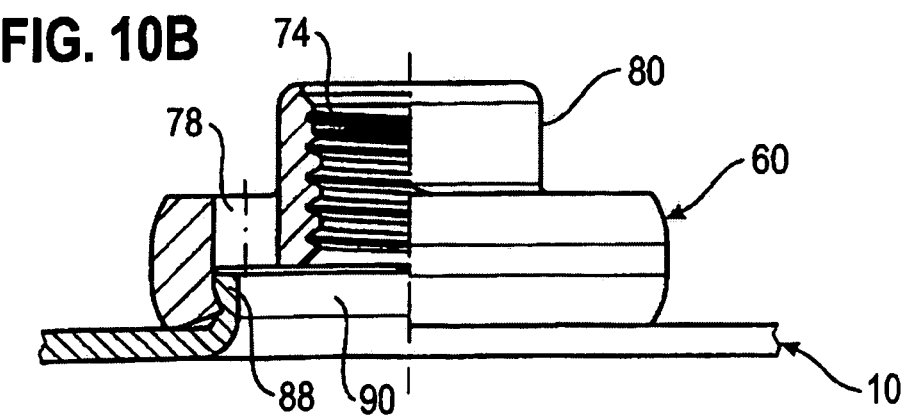

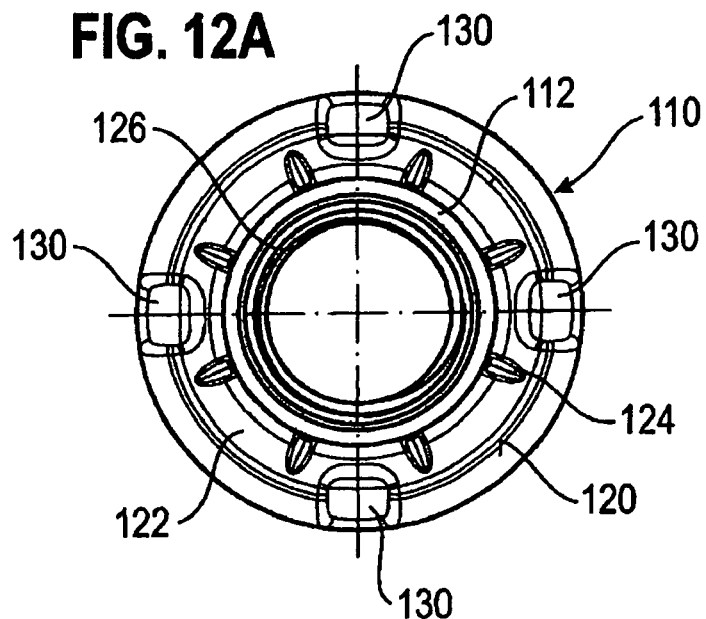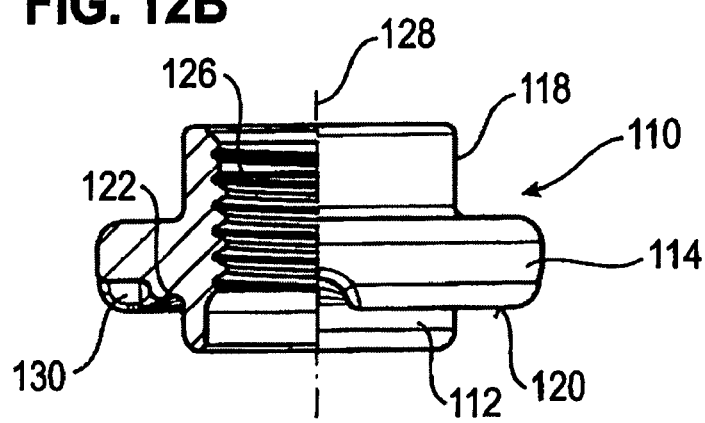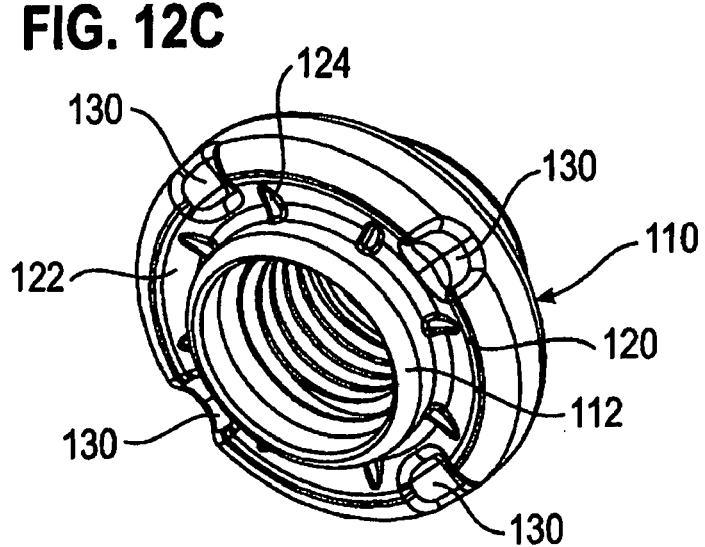

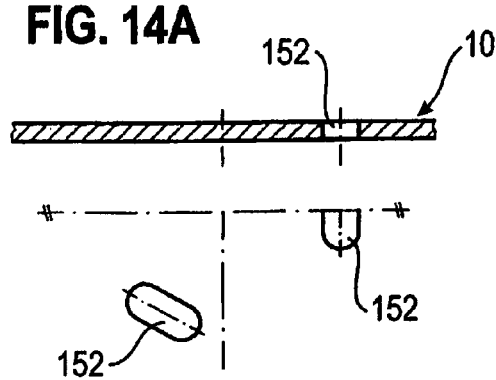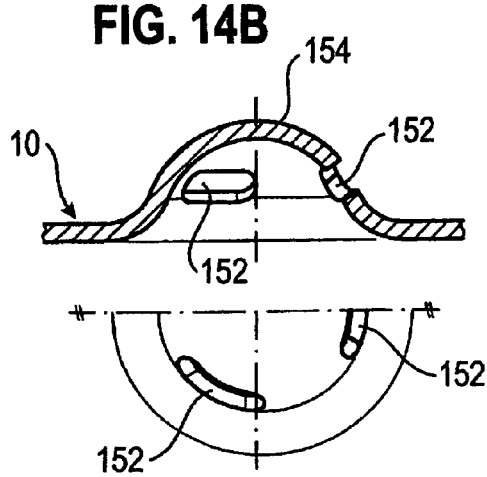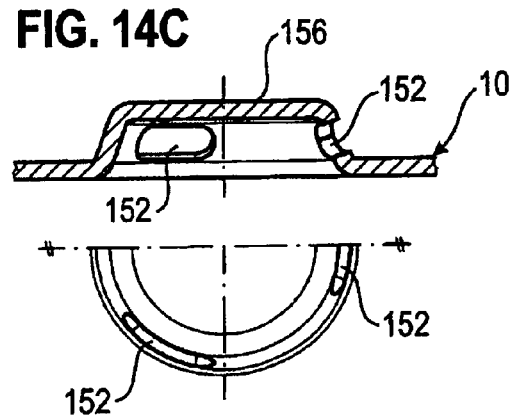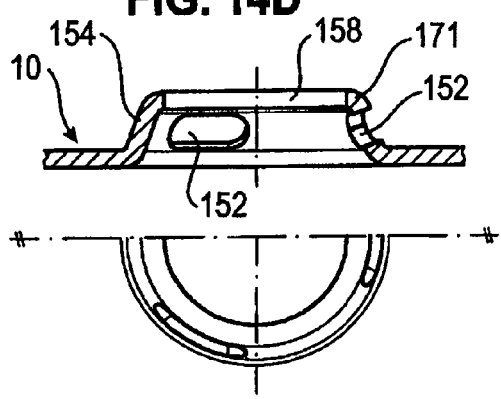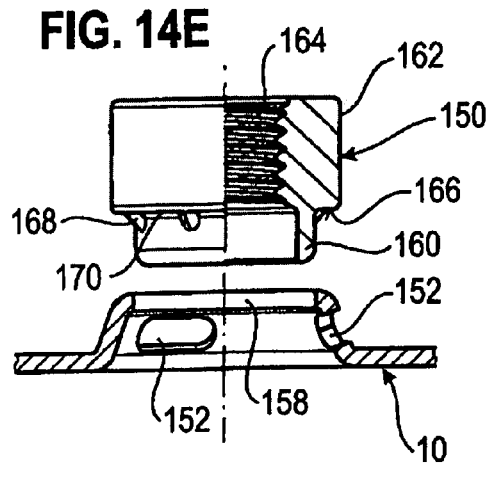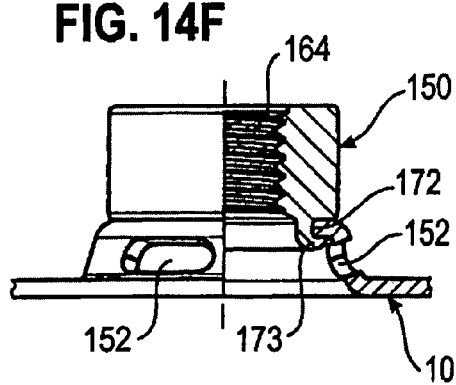

COMPONENT ASSEMBLY COMPRISING A SHEET METAL PART AND A NUT ELEMENT ATTACHED THERETO AND ALSO A METHOD FOR THE MANUFACTURE OF SUCH A COMPONENT ASSEMBLY

The present invention relates to a component assembly comprising a sheet metal part and a nut element attached thereto, the nut element being arranged in an opening of the sheet metal part and being adapted to receive a bolt element having a shaft part with a thread and a head part of larger radial dimensions. The invention also relates to a method of manufacturing such a component assembly.

Such component assemblies are extremely well known from many patent specifications, with the nut element normally having a flange region which is arranged at the side of the sheet metal part remote from the head part of the bolt. The bolt element is then normally used in order to secure another component to the component assembly consisting of the nut element and the sheet metal part. The other component is clamped between the head part of the bolt element and the sheet metal part.

Arrangements of this kind are also known in which one operates without a further component, for example when the nut element is used as a drain point at an oil pan or sump. In this case the shaft part from the bolt element is screwed into the thread of the nut element and seals directly or indirectly by means of an interposed seal against the underside of the nut element.

A problem with such oil pans is that the oil pan cannot be completely emptied on draining the oil because the flange region of the nut element has a certain constructional height within the oil pan and thus a residual volume of oil cannot be drained off.

This residual volume is however problematic, in particular but not exclusively when the engine of the car is started as a test or for running in before leaving the manufacturer's plant. It is namely usual nowadays to allow the engine to run for about 15 minutes at the manufacturer's plant and to subsequently carry out an oil change. It is particular important with this first oil change to remove swarf and abrasive particles which are unavoidably present in the engine with the oil, particularly since the first regular oil change will only be carried out after 10,000 to 20,000 km. The larger the residual volume of oil which cannot be drained the more swarf and abrasive particles remain in the engine and the higher is the probability that motor damage will be caused hereby.

The object underlying the present invention is to provide a component assembly, which is in particular suitable as an oil pan or as a drain point for another fluid, by which the oil or the other fluid can be drained as fully as possible or at least down to a small residual quantity, independently of the constructional height of the flange part of the nut element.

In order to satisfy this object provision is made in accordance with the invention that the sheet metal part has at least one hole or a cut-out adjacent to the nut element which is not covered by the nut element but can however be covered over by the head part of the screwed-in bolt element.

Although the flange part of the nut element can be arranged now as previously above the sheet metal part the oil or another fluid can always be drained after removing of the bolt element so that only a very small residual quantity of the liquid (if at all) remains in the oil pan and indeed without the head part of the bolt projecting further downwardly than before, which is for example undesired in a motor car in order to avoid as far as possible damage to the oil pan by ground contact.

Particularly preferred embodiments of the component assembly can be found in the subordinate claims.

The sheet metal part can lie in one plane in the region of the attachment of the nut element, with a region of the nut element which lies opposite to a flange part then projecting through the sheet metal part. In order to achieve the required seal between the head part of the bolt element and the sheet metal part, a sealing ring is then used which is larger in its axial dimension than the axial dimension of the region of the nut element which projects through the lower side of the sheet metal part. In such an arrangement the sealing ring can have an inner diameter which has at least substantially a circular shape which can be centred by the region of the nut element projecting through the sheet metal part. If, for example, the region of the nut element which projects to the sheet metal part has a square or rectangular shape then the sealing ring can be centred by the four corners of the projecting region.

Another possibility consists in arranging the opening of the sheet metal part or of the hole or holes in the base region of a recess or dished region.

In this arrangement the region of the nut element projecting through the sheet metal part can be arranged in the recess and indeed such that it is set back relative to the side of a sheet metal part confronting the head part of the bolt element. In this case a sealing ring is used which seals against the sheet metal part radially outside of the recess, i.e. the sealing ring forms a seal with the sheet metal part and with the head part of the bolt at the lower side of the sheet metal part radially outside of the recess.

It is particularly preferred when the nut element has a rectangular or square shape in plan view. Such nut elements are well known, for example in the form of a so-called UM element or HI element or URN element of the company Profil, with the UM elements and the HI elements being introduced into a rectangular opening of the sheet metal part and being held therein by means of clinched or stamped features which are effected at two oppositely disposed sides of the element which is rectangular in plan view. In this way they are held in a manner safe against press-out and safe against rotation at the sheet metal part. With an arrangement of this kind, with a rectangular opening in the sheet metal part which can be connected in a shape-locked manner to the nut element by clinched features at two oppositely disposed sides of the opening a hole, or a cut-out can respectively be provided at the two further oppositely disposed sides of the opening without this impairing the security against rotation in the sheet metal part of the element which is of square-shape in plan view to a significant degree. With a URN element holes can also be provided around the cylindrical rivet section without significantly impairing the security against rotation of the nut element in the sheet metal part.

The invention is not restricted to the use of elements which are rectangular in plan view but rather can be used in principle with the most diverse forms of fastener elements which can be introduced into or attached to a sheet metal part as press-in elements or rivet elements.

Finally, the present invention relates to a method with the particular feature that the hole or holes in the sheet metal part are produced in one stamping process which is used to manufacture the opening prior to the attachment of the nut element.

Figure 1B:
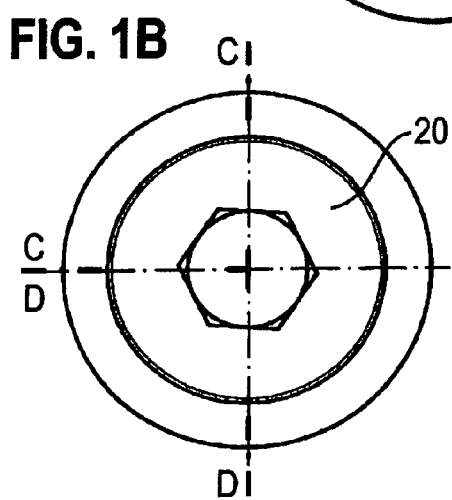
Figure 1D:
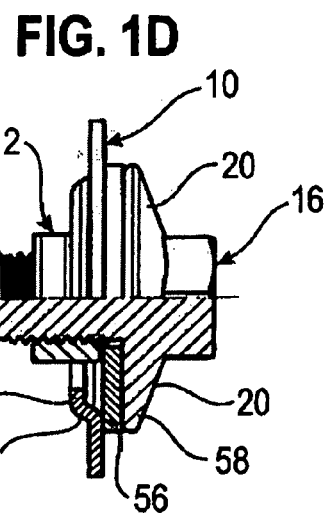
Figure 1C:
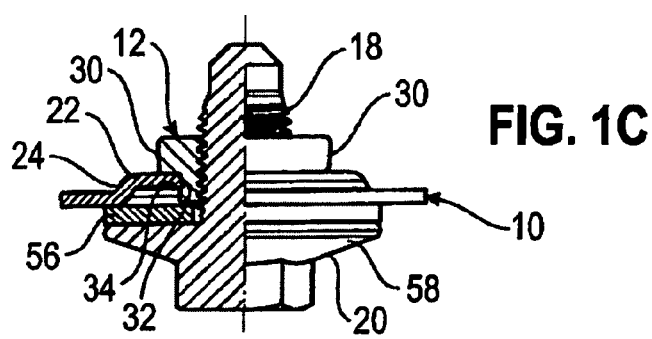
Figure 3A:
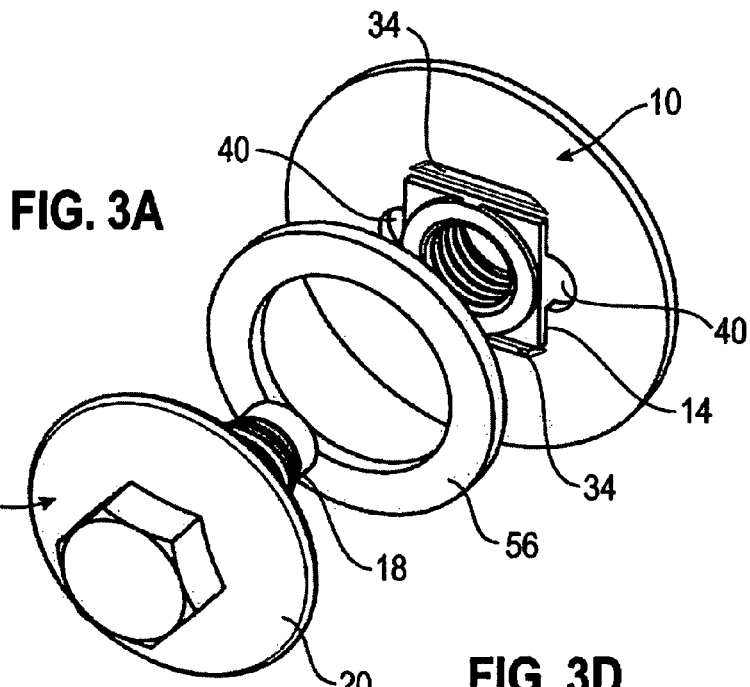
Figure 3B:
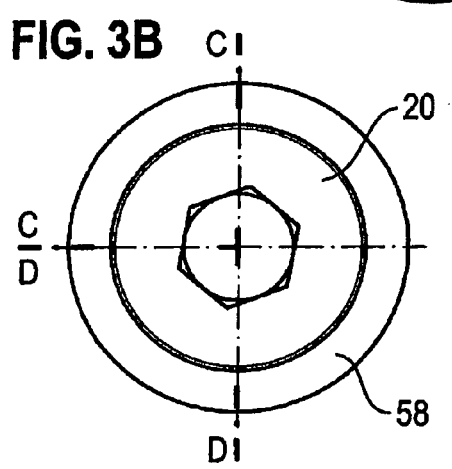
Figure 3D:
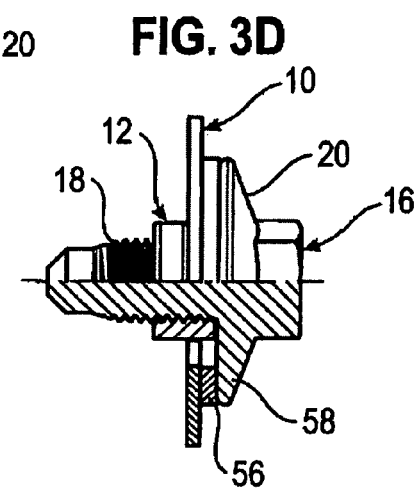
Figure 3C:
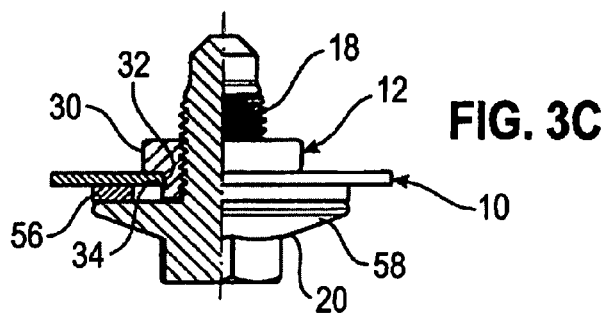
Figure 4A:
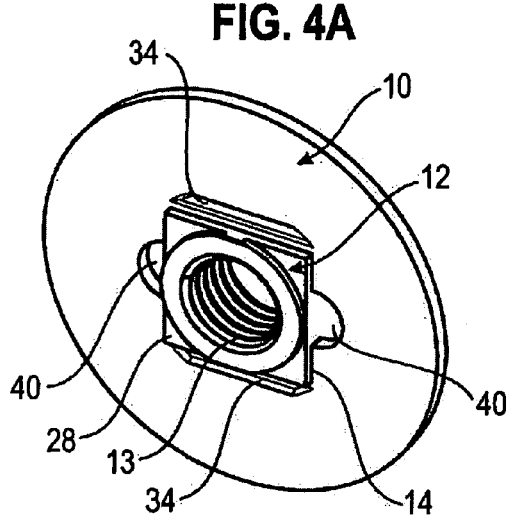
Figure 4B:
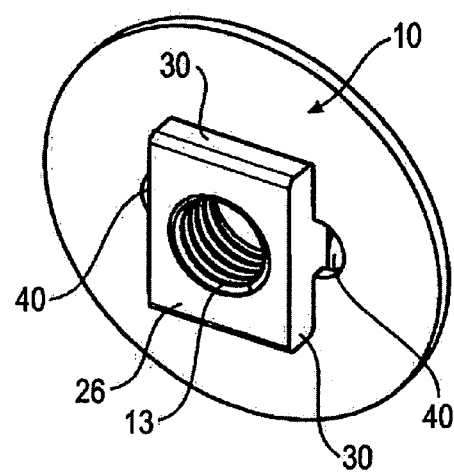
Figure 4C:
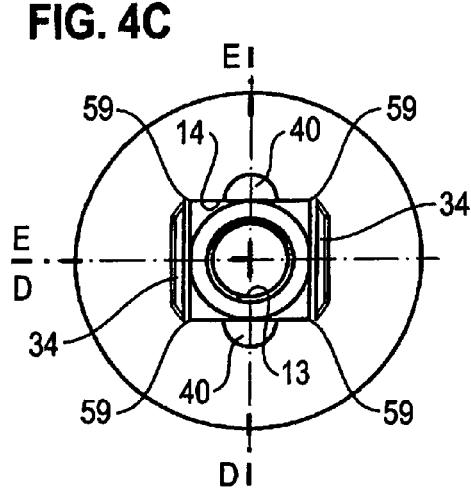
Figure 4D:
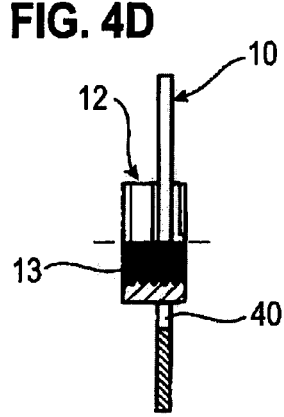
Figure 4E:
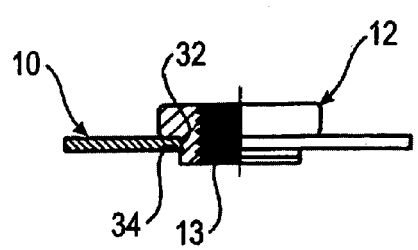
Figure 6A:
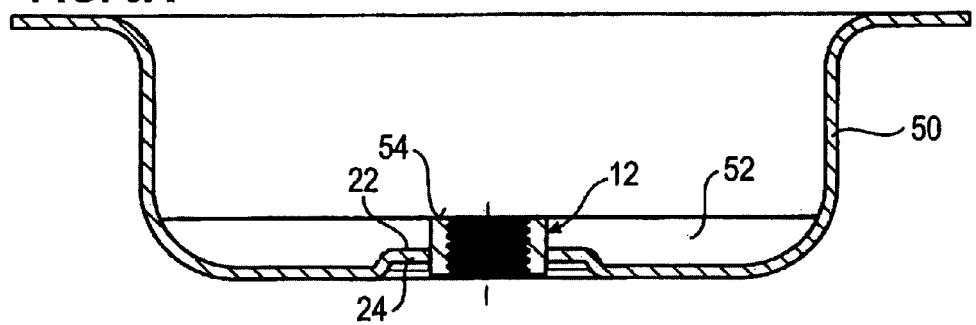
Figure 6B:
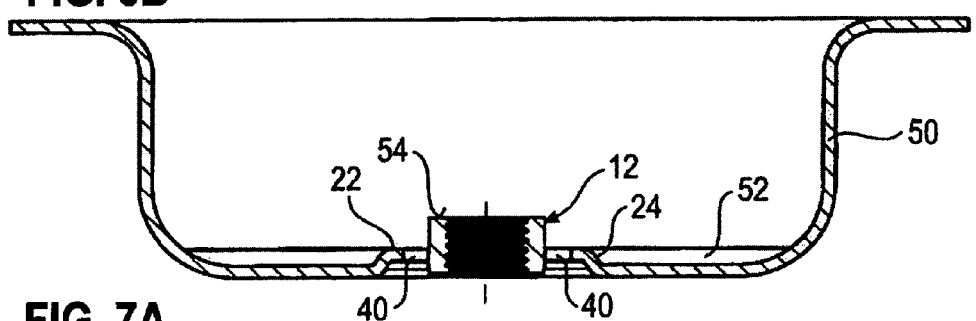
Figure 7A:
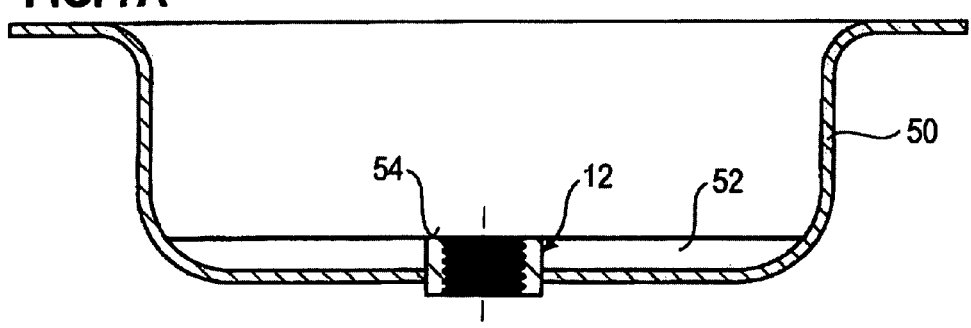
Figure 7B:
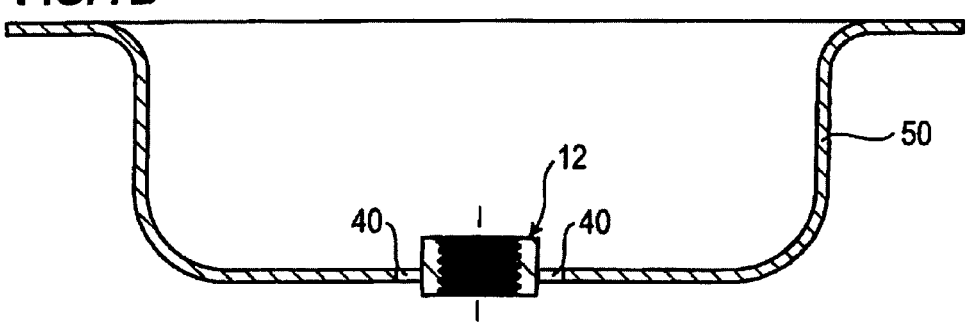
Figure 8A:
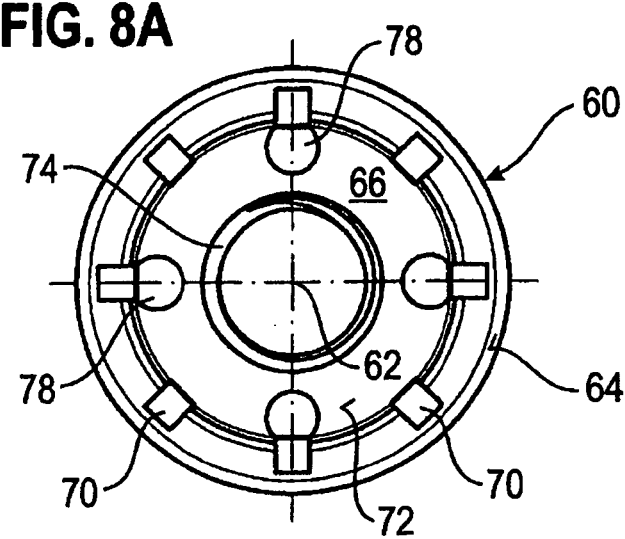
Figure 8B:
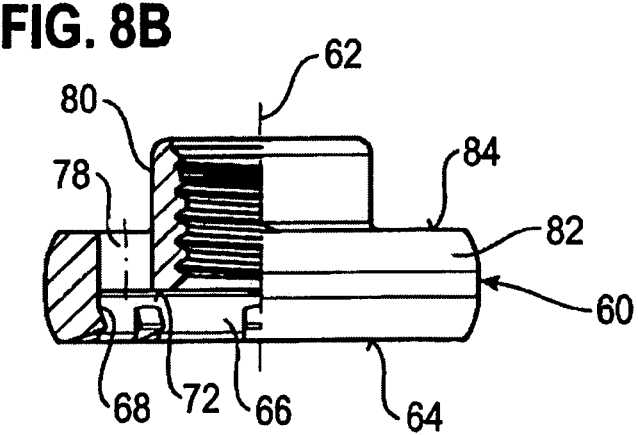
Figure 8C:
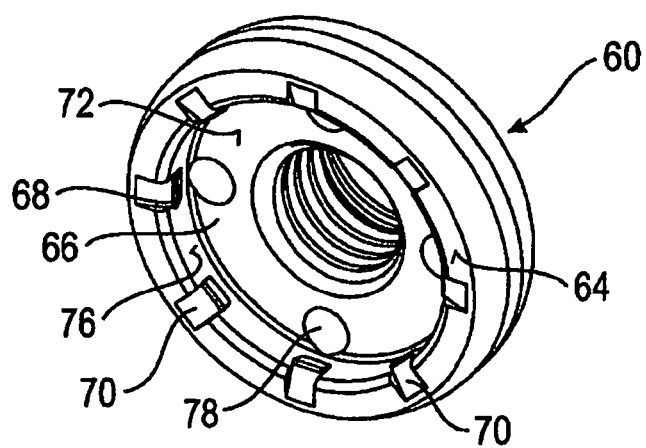
Figure 11A:
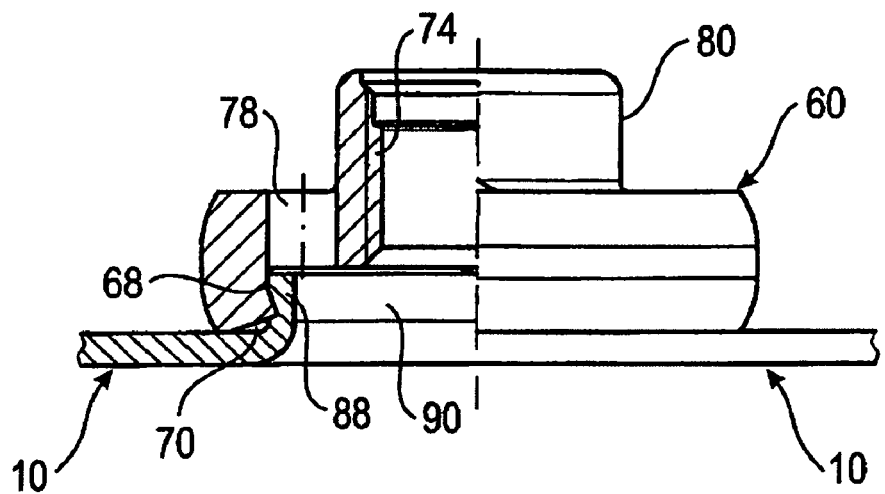

The invention will be explained in more detail in the following with reference to embodiments and to the drawing in which are shown:

FIGS. 1A to D a representation of a component assembly and indeed in FIG. 1A in a perspective view in unscrewed form; in FIG. 1B in a plan view onto the head part of the bolt, in FIG. 1C in a partly sectioned view along the section plane C-C of FIG. 1B and in FIG. 1D in a partly sectioned view along the section plane D-D in FIG. 1B;

FIGS. 2A to 2E representations of a component assembly corresponding to that of FIG. 1, with FIG. 2A showing the sheet metal part with the inserted nut element of FIG. 1A in a perspective view onto the underside of the sheet metal part, FIG. 2B shows a corresponding representation from the upper side of the sheet metal part, FIG. 2C a plan view of the component assembly of FIG. 2A from below and FIGS. 2D and 2E two partly sectioned views in two different planes and indeed in FIG. 2D in accordance with the plane D-D of FIG. 2C and in FIG. 2E in accordance with the plane E-E of FIG. 2C, FIGS. 3A to 3D representations corresponding to FIGS. 1A to 1D but with a sheet metal part not having a recess, FIGS. 4A to 4E correspond to FIGS. 2A to 2E but also here with a sheet metal part without a recess, i.e. with a sheet metal part in accordance with FIGS. 3A to 3D, FIGS. 5A to 5F further drawings which show two alternatives, FIG. 6A a oil pan not in accordance with the invention but with an attached nut element, FIG. 6B an oil pan in accordance with the invention with an attached nut element with holes in accordance with the invention, with the nuts in accordance with FIGS. 6A and 6B each being disposed in a recess, FIGS. 7A and 7B representations corresponding to FIGS. 6A and 6B in which the nut elements are each introduced into a sheet metal part without a recess, FIGS. 8A to 8C representations of a nut element in accordance with the invention which has the basic shape of a so-called RSU element of the company Profil Verbindungstechnik GmbH & Co. KG, FIGS. 9A to 9D a series of drawings showing a first possibility of attaching the nut element in accordance with FIGS. 8A-8C to a sheet metal part with pre-piercing of the sheet metal part, FIGS. 10A, 10B two further drawings in order to show a further possibility of attaching the RSU element to a sheet metal part using a preceding hole punch, FIG. 11A a different graphic illustration of the component assembly in accordance with FIGS. 9D and 10B, FIG. 11B the complementation of the component assembly in accordance with FIG. 11A with an oil drain screw, FIGS. 12A to 12C representations of fastener elements in accordance with the invention in the form of a modified RND element of the company Profil Verbindungstechnik GmbH & Co. KG, FIGS. 13A to 13F a series of drawings to explain the attachment of the modified RND element in accordance with FIGS. 12A to 12C to a sheet metal part, FIGS. 14A to 14H as series of drawings to explain the attachment of an RSN element of the company Profil Verbindungstechnik GmbH & Co. KG to a sheet metal part, with the FIG. 14G showing the component assembly in accordance with FIG. 14F to an enlarged scale and FIG. 14H showing the complementation of the component assembly with an oil drain screw.

FIG. 1 shows a component assembly comprising a sheet metal part 10 and a nut element 12 attached thereto which is arranged in an opening 14 of the sheet metal part and is designed to receive a bolt element 16 having a shaft part 18 with a thread and a head part 20 of larger radial dimensions. I.e. the head part 20 has a larger radial dimension than the shaft part 18. The sheet metal part 10 shown here as a round disk is, however, normally a shaped sheet metal part, for example with a trough shape in accordance with the oil pan 50 of FIG. 6B.

In this embodiment the opening 14 of the sheet metal part is of square shape and the opening 14 is provided in the base region 22 of a recess 24 in the sheet metal part 12. The nut element shown here is a so-called UM element of the company Profil Verbindungstechnik GmbH & Co. KG which has been used for many years. Normally the corresponding nut element, which has a rectangular shape in plan view, is introduced in a self-piercing manner into the sheet metal part, although it is also known to attach the nut element in a pre-punched sheet metal part, i.e. a sheet metal part having a square opening.

The nut element itself has a head part 26 which can be seen from FIG. 2B, which is of rectangular shape and which has a piercing section 28 which is of square shape which passes through the opening in the sheet metal part. To the left and right of the piercing section in accordance with FIG. 2E there are flange regions 30 which contact the base region of the recess (in FIG. 2E at the upper side of the base region) and hereby form the sheet metal contact surface of the element. To the left and right of the square piercing section, i.e. the region which is not used here in a self-piercing manner but which projects through the opening 14 in the sheet metal part, there are further provided undercuts 32, with the sheet metal part being pressed into these undercuts by means of corresponding stamped or coined features 34 in order to hold the element in a form-fitted manner and secure against rotation in the base region of the recess, i.e. at the sheet metal part. The stamped or coined features 34 are produced by a correspondingly designed die button as is extremely well known per se.

In accordance with the invention the sheet metal part 12 has at least one hole or a cut-out 40 which is not covered by the nut element. As is, for example, readily visible with regard to FIG. 1A, the two coined or stamped feature 34 are provided at oppositely disposed sides of the square piercing section of the nut element 12, whereas the two holes 40 are arranged in the centre of the two further oppositely disposed sides of the piercing section. Since these holes are not covered over by the nut element 12 oil can flow through the holes provided these holes are not covered over by the head part 20 of the bolt element 16 or by a corresponding sealing ring 56.

In order to explain this in more detail reference will now be made to FIGS. 6A and 6B. FIG. 6A shows an oil pan 50 having a nut element 12 which is arranged in the base region of a recess 24. One can see that in this embodiment the oil 52 in the oil pan 50 can only flow away down to the level of the upper side 54 of the nut element, so that a considerable residual oil quantity remains in the oil pan, which is disadvantageous because it contaminates a freshly filled oil and also prevents the flowing away of the smaller particles of swarf or contamination.

In comparison FIG. 6B shows a similar arrangement to that of FIG. 6A but with the two holes 40 in the base region 22 of the recess 24. One can see here that the oil 52 can now flow away down to the level of the base region 22 of the recess 24 so that a considerably smaller residual quantity of oil remains in the oil pan 50.

When the bolt element 16 is screwed into the thread 13 of the nut element 12 the head part 20 of the bolt or the seal 56 which is normally provided, contacts the sheet metal part radially outside of the recess 24 and seals here. I.e., when a sealing ring 56 is provided, which is the normal case, the flange region 58 of the head part 20 of the bolt element 16 clamps the sealing ring 56 between itself and the underside of the sheet metal part 10 radially outside of the recess 24 so that a ring seal is formed here. Since the ring seal is formed radially outside of the recess 24 or of the opening 14 and the holes 40 it is not necessary for the nut element to be attached in sealed manner to the sheet metal part. Thus the cost and complexity required for the corresponding seal, which could optionally be produced by an adhesive, can be spared.

The sealing ring 56 is centred here by the shaft part 18 of the bolt element 16 so that it adopts the position shown in accordance with FIG. 1C or 1D on screwing the shaft part 18 of the bolt element into the thread 13 of the nut element.

The arrangement with two holes 40 at two sides of the piercing section of the nut is preferred because these holes do not impair the security of the nut element against rotation but on the other hand can be made large enough to drain the oil without hindrance. On removing the bolt element the oil flows both through the thread cylinder 13 of the nut element and also through the two holes 40. The holes 40 ensure that the oil is completely removed down to the small residual quantity in accordance with FIG. 6B. One also notes from FIGS. 1C and 1D or 2E and 2D that the piercing section of a nut element 12, i.e. the region which passes through the opening 14 in the sheet metal part, is set back slightly from the lower side of the sheet metal part so that the sealing ring 56 seals in the desired region radially outside of the recess. At this point it should also be briefly pointed out that it is not essential for the holes to open into the opening or, so to say, the cut-outs in the rim of the otherwise square opening (as illustrated in all the embodiments shown here). It can also be separated from the rim of the opening by material webs of the sheet metal part, should not however lie radially outside of the ring seal with the underside of the sheet metal part. It should preferably lie radially within the ring seal.

FIGS. 3 and 4 show an arrangement which is very similar to the arrangement of FIGS. 1A to 1D or 2A to 2E but with the exception that no recess is provided here in the sheet metal part. For this reason the same reference numerals are used in FIGS. 3 and 4 as in the previous Figures and the previous description also applies for FIGS. 3 and 4 unless something to the contrary is expressed.

Since the holes 40 are now no longer arranged in the base region of a recess, but rather in the sheet metal part in the plane of the underside of the sheet metal part one succeeds, as a comparison of FIGS. 7A and 7B shows, in fully removing the oil from the pan (FIG. 7B), i.e. the oil can flow away fully. On the other hand, the fact that no recess is provided leads to a situation in which the piercing section of the nut element, i.e. the region of the nut element which projects through the opening of the sheet metal part (which is also not used in self-piercing manner here) projects out of the lower side of the sheet metal part, i.e. out of the oil pan. This makes it necessary to operate with a sealing ring 56 which has an axial height which is somewhat greater than the amount by which the piercing section of the nut element projects out of the sheet metal part. On the other hand, the sealing ring 56 can be centred here by the four corners 60 of the piercing section of the nut element, so that in this case a high quality seal can also be achieved between the head part 20 of the bolt element 16 and the underside of the sheet metal part 10.

At this point it should be mentioned that car or engine manufacturer endeavour to keep the distance by which the drain screw projects from the oil pan as small as possible, because otherwise the danger is larger that the drain screw can be torn out of the oil pan by ground contact. For this reason an attempt is also made to accommodate the drain screw at a point which is less endangered, for example at the rear end of the oil pan or hidden behind a cross member or the like. It is also known to design the base region of the oil pan in a sloping manner and to arrange the drain point at the lowermost region of the slope so that in this way the residual quantity of oil can also be minimized. The drain point can also be provided in an oblique surface of the oil pan, for example in the region of a lower corner of the pan. With the present invention one succeeds in almost fully removing the oil from the lowermost corner. Even if a residual quantity of oil is still present as a result of the manner of construction in accordance with FIG. 6B this quantity can be further reduced when the car or the engine is arranged inclined in the longitudinal direction or to the side during the oil drainage procedure, so that the oil drainage position lies at the lowest point.

Figure 5A:
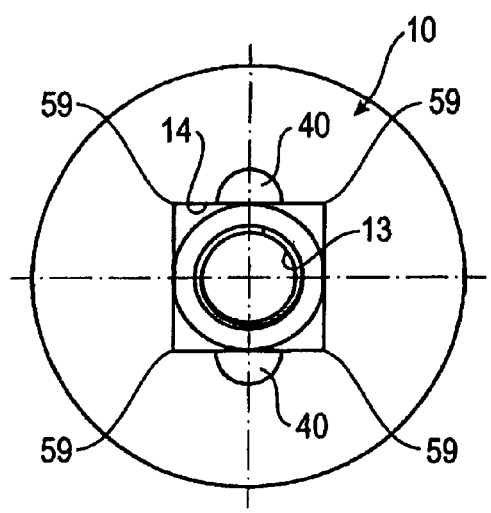
Figure 5D:
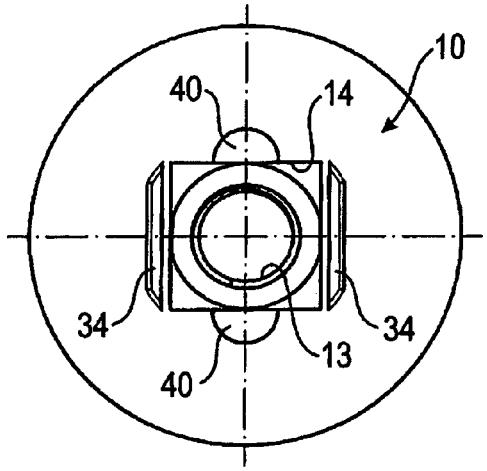
Figure 5B:
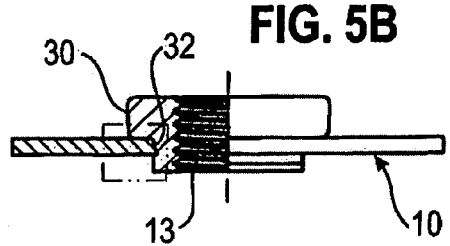
Figure 5E:
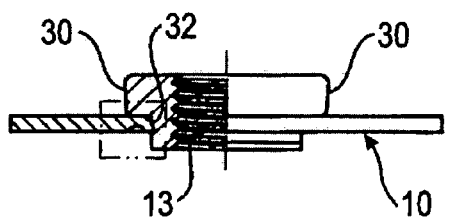
Figure 5C:
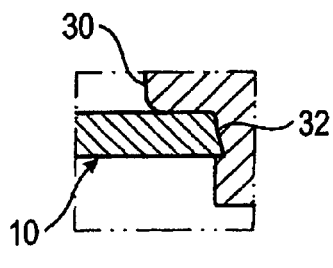
Figure 5F:
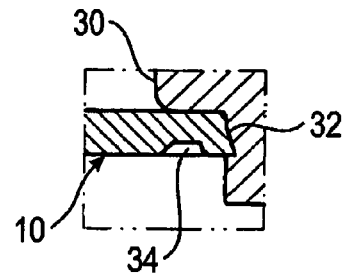

Reference is now made to FIGS. 5A to 5F. These show at the left and the right side two different methods for the attachment of a UM element into a sheet metal part. In FIGS. 5D to 5F the sheet metal part is provided with coined or stamped features 34 by corresponding noses of a die button (not shown) which, as previous explained, press the sheet metal material into the undercut of the piercing section of the nut element. This can be straightforwardly seen from FIG. 5E and also from FIG. 5F. From FIG. 5D one can see that the sheet metal part is orientated so that the stamped or coined features are arranged at the left and right sides of the piercing section of the nut element (which is also not used in self-piercing manner here) and that the two holes 40 or cut-outs are arranged at the upper and lower sides of the piercing section. These holes 40 are produced with a punch which has the shape of the square opening 14 of the sheet metal part and is supplemented by the shape of the approximately semi-circular holes 40.

The same applies to the FIGS. 5A to 5C except that here the sheet metal part is not processed with the die button in order to introduce it into the undercuts of the element but rather the corresponding riveting die deforms the piercing section of the nut element (which is also not used here in a self-piercing manner). In other words the element itself is deformed. In this way the sheet metal material is received in a form-fitted manner into the undercuts, i.e. by deformation and expansion of the material of the piercing section which is dilated over the rim of the opening 14 in the sheet metal material and undercuts are formed in the piercing section at two oppositely disposed sides which receive corresponding rim regions of the opening 14.

The invention can also be used with only one hole or with more than two holes. It is not restricted to the use of elements with a square or rectangular shape in plan view but rather cylindrical or round elements or other elements can also be used. With elements having a round rivet section three holes or cut-outs can for example be produced in the rim region of the circular opening of the sheet metal part through which the rivet section of the elements is passed. The holes must however be made so large that they project radially further outwardly than the contact surface of the element so that the oil, or another liquid, can flow through them when the element is secured to the sheet metal part and the bolt element is removed.

FIGS. 8A to 8C show a modified form of the RSU element of the company Profil Verbindungstechnik GmbH & Co. KG which is described in more detail in EP 0 759 510 B1.

In this connection FIG. 8A shows a plan view onto the underside of the modified RSU element 60, FIG. 8B a side view of the corresponding element at the right hand side of the central longitudinal axis 62 of the element and in an axial section at the left hand side of the central longitudinal axis 62, whereas FIG. 8C shows a perspective representation from below.

As described and claimed in EP 0 759 510 B1 the RSU element 60 is a hollow body element in the form of a nut element for attachment to a plate-like sheet metal part, with a ring-like or cylindrical recess 66 being present at the end face 64 of the hollow body element which is to be attached to the sheet metal part, within this raised ring-shaped contact surface 64 and with a plurality of undercuts 68 being provided in a sidewall 76 of the recess 66 as well as features 70 providing security against rotation. The base surface 72 of the recess 66 extends up to the threaded bore of the hollow body element and merges at least substantially without a pilot part into this cylindrical bore 74.

The security against rotation is provided here by a plurality of mutually spaced recesses 70 in the ring-like contact surface 64. The manufacture of these recesses leads to the undercuts 68 being provided at the sidewall 76 of the recess 66, i.e. these undercuts lie at peripheral positions which correspond to the recesses 70 in the ring-like contact surface 64 providing security against rotation.

The element shown in FIG. 8A to 8C is distinguished from a customary RSU element in that four bores 78 are provided around the central fastening section 80 of the element, i.e. the cylindrical part which has the threaded bore 74. It should be pointed out that the "bores" 78 do not necessarily have to be bored but rather can be formed by corresponding stamps during the manufacture of the element by means of cold forming. As is shown in FIGS. 8A to 8C four such bores 78 are provided which are arranged at an angular spacing of 90° to one another and indeed in each case at the point of a corresponding undercut 68. This number of bores is however not essential more bores or fewer bores can be provided. It is also not essential that they are arranged at the positions of the undercuts 68. In practice four such bores are however preferably provided. It should also be pointed that it is in no way necessary, as shown here, to provide eight recesses in the end face of the element i.e. eight corresponding undercuts, but rather more or fewer such recesses providing security against rotation and undercuts can be provided.

One notes that the fastener section 80 projects out of the flange region 82 of the element 60 and that the flange region 82 is made relatively broad and thus offers space for the bores 78 which communicate between the upper contact pressure surface 84 of the element and the recess 66. In this way the bores 78 can be made with a relatively large diameter so that oil can drain in problem-free manner through the bores 78.

A first possibility for the attachment of the elements in accordance with FIGS. 8A to 8C to a sheet metal part is shown by the series of sketches of FIGS. 9A to 9D.

In accordance with FIG. 9A the sheet metal part 10 is pre-pierced, i.e. provided with a circular hole 86. In a subsequent separate stage the rim of the aperture of the hole 86 is bent upwardly by means of a correspondingly designed die button in order to form a material collar 88. As is evident with respect to FIG. 9C, the element 60 is then placed onto the collar 88 and the collar is deformed radially outwardly by means of a corresponding die button (not shown) so that the sheet metal material is pressed in form-fitted manner into the undercuts 68 and into the recesses 70 forming the security against rotation. In this way the element 60 is secured to the sheet metal part in a manner secure against rotation and press-out as shown in FIG. 9D. One notes that the bores 78, of which only one can be seen in FIG. 9D, communicate with the hollow cylindrical space 90 which is provided inside the recess 66, i.e. inside the collar-like region 88 of the sheet metal part 10. In this way oil has the possibility of flowing away through the bores 78 of the hollow cylindrical space 90.

During deformation of the collar region 88 by means of the corresponding (not shown) die button the element is moved by means of a setting head towards the die, with the punch of the setting head exerting a pressure onto the ring-like contact pressure surface 84 but not however at the fastener section 80 in order to avoid an undesired deformation of the threaded bore 74.

FIG. 10A shows an alternative possibility of manufacturing the form-fitted connection between the element 60 and the sheet metal part 10.

In this embodiment the element 60 is provided in a shape matched stepped bore 90 of a setting head 92 which is provided with a central hole punch 94. This arrangement, i.e. the element 60 with the setting head 92 and the hole punch 94 is located above the sheet metal part 10. At the lower side of the sheet metal part 10 there is located a die button 93 which can have the same shape as the die button which is used to form the collar region 88 of the sheet metal part 10 into the undercuts 68 or into the recesses 70 providing security against rotation.

As is usual in the attachment of such element the setting head and the die button are arranged on different tools of a press and, on closing of the press, the setting head is moved towards the die button or vice versa. In this connection a hold-down member for the sheet metal is normally used which is arranged concentrically around the setting head 92 and which presses the sheet metal part 10 against the end face 95 of the die button. This takes place in a first closing phase of the press. During the further closing of the press the hole punch enters into contact with the sheet metal part and, in collaboration with the central bore 97 of the die button, cuts a piercing slug out of the sheet metal part with the piercing slug being disposed of through the central bore of the die button. At the same time the cylindrical post 99 of the die button presses the sheet metal part into the desired collar shape 88 and deforms the material of the collar region 88 so that this sheet metal material is formed into the undercuts 68 and also into the recesses 70 providing security against rotation. The result in FIG. 10B corresponds then to the result of the alternative method in accordance with FIG. 9D. One can see from FIGS. 8B, 9D and 10B that the thread in the upper region of the element 60 is made slightly under-dimensioned and the thread can be easily deformed here in order to generate a certain security against rotation for the drain screw which has to be screwed into place.

Figure 11B:
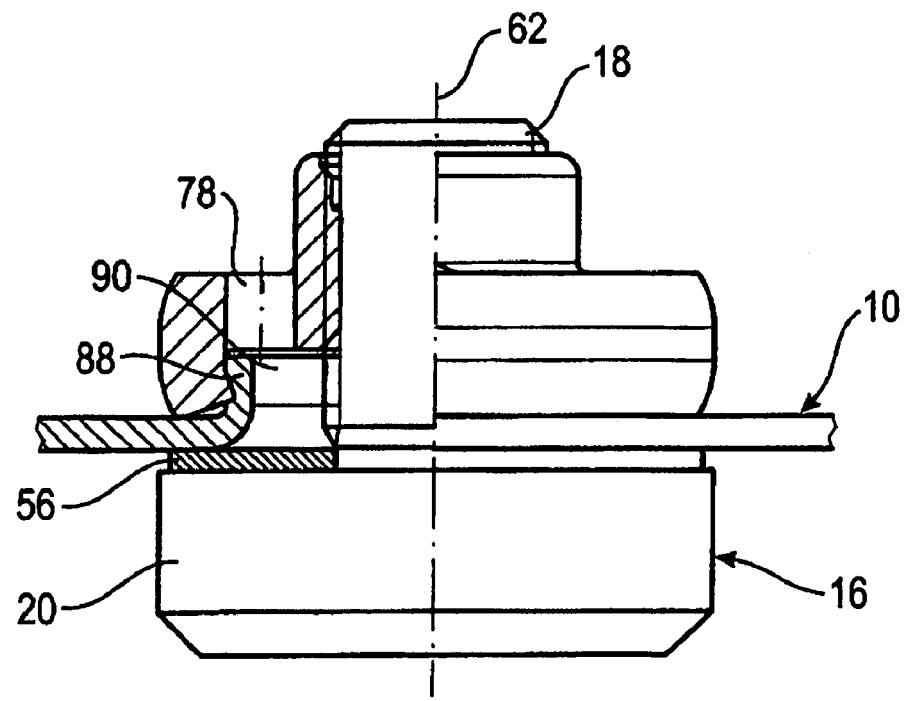

FIG. 11A then shows once again the component assembly consisting of the element 60 and the sheet metal part 10, i.e. the result of the manufacturing process in accordance with FIG. 9D or FIG. 10B, but in a different illustration in which the thread cylinder is schematically shown. In FIG. 11B an oil drain screw 16 is then screwed into the threaded bore of the functional element, i.e. the shaft part 18 of the oil drain screw with the thread is now located in the cylindrical bore of the element 60, whereas the head part 20 of the oil drain screw, which is of significantly larger diameter, presses a ring seal 56 against the lower side of the sheet metal part radially outside of the ring-like collar and thus forms an oil-tight closure here.

As can be seen from FIG. 11B the sealing ring is centred here by the shaft part of the oil drain screw, the sealing ring can be so designed that it is connected in form-fitted manner and non-losably to the shaft part 18 of the oil drain screw 16. Another possibility for this seal consists in providing a ring-like groove in the, in FIG. 11B upper, contact surface of the head part of the oil drain screw (not shown) which serves to receive a ring seal, for example in the form of an O-ring. The O-ring is then centred by the head part of the oil drain screw and pressed against the underside of the sheet metal part 10.

The head part 20 of the oil drain screw 16 can be provided with a polygonal outer periphery or with a central recess, i.e. a recess arranged concentrically to the central longitudinal axis, such as for example a recess to receive a six cornered key (inbus) or a different key such as a Torx Key Recess™.

One can see from FIG. 11B that an oil-tight closure is provided here between the head 20 of the oil drain screw and the sheet metal part 10 by means of the sealing ring 56 and that on removing the oil drain screw the oil can flow away via the bores 78 and the hollow cylindrical space 90 radially inside the collar 88.

At this point it should also be briefly mentioned that an RSU element can also be realized in modified form, for example in accordance with the European patent 957 273 in which the security against rotation is formed by a wave-shaped groove in the contact surface of the element, with the radially inner apex points of the wave-shaped recess being arranged at the positions of the undercuts. A modified element of this kind, i.e. with bores directed in the axial direction, in accordance with the bores 78 of the embodiment of FIGS. 8 to 11, can also be provided.

The FIGS. 12A to 12C show an alternative element in the form of an modified RND element of the company Profil Verbindungstechnik GmbH & Co. KG and indeed in representations corresponding to FIGS. 8A to 8C.

Such RND elements are well known per se and are amongst other things protected by the European patent 1 116 891. As claimed there, a customary RND fastener element 110 consists of a riveting cylinder section 112, a flange section 114 which extends radially away from the cylindrical riveting section 112 generally perpendicular to the latter and a fastener section 118 which lies opposite to the cylindrical riveting section 112, with the flange section 114 including an outer ring-like sheet metal contact surface 120. A ring-like groove 122 is provided adjacent to the cylindrical section 112 and surrounds the cylindrical section radially within the outer ring-like sheet metal contact surface 120. Furthermore, a plurality of spaced radial ribs 124 is provided which bridge the groove 122. The fastener section of the element 110 has, as shown here, a bore having a thread 126 which is arranged coaxially to the cylindrical section 112 and to the central longitudinal axis 128.

In this connection the ring-like groove 122 is of generally V-shape and extends radially inwardly in the direction of the cylindrical section 112.

The element 110 shown in FIGS. 12A to 12C is distinguished from a customary RND element in that four radially extending grooves 130 interrupt the ring-like contact surface 120, with these radially extending grooves 130 being provided for oil drainage. In order to explain this in more detail reference is made to the FIGS. 13A to 13F which show the attachment of the element 110 in accordance with FIGS. 12A to 12C to a sheet metal part 10.

Figure 13A:
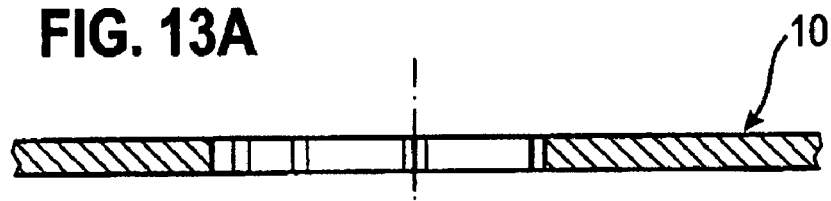
Figure 13B:
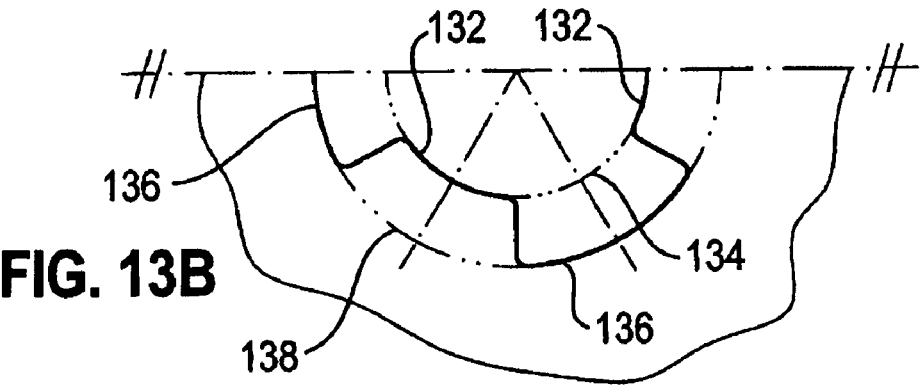
Figure 13C:
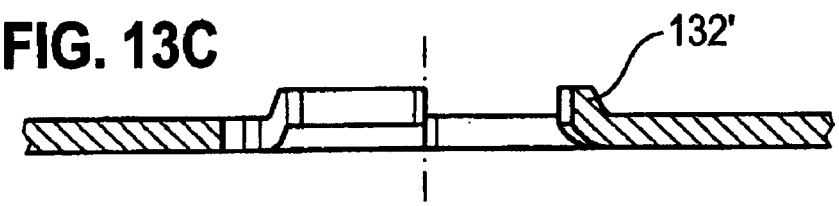
Figure 13D:
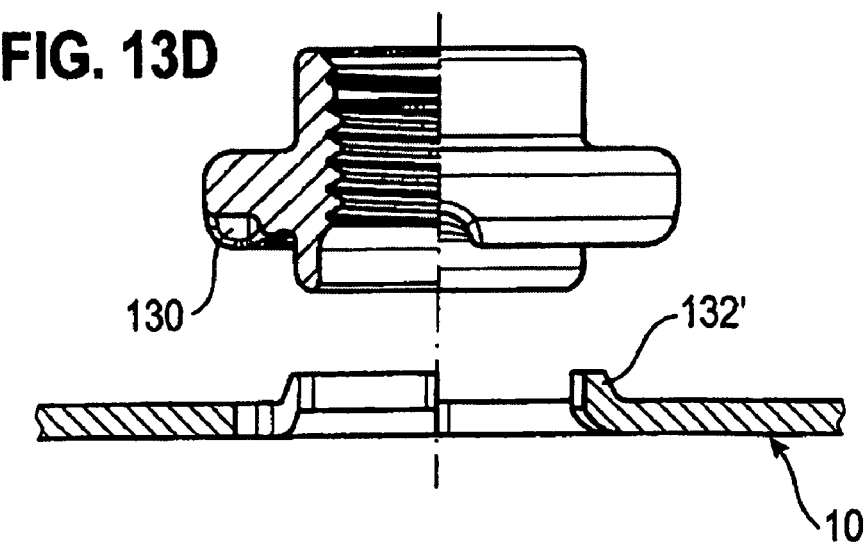
Figure 14G:
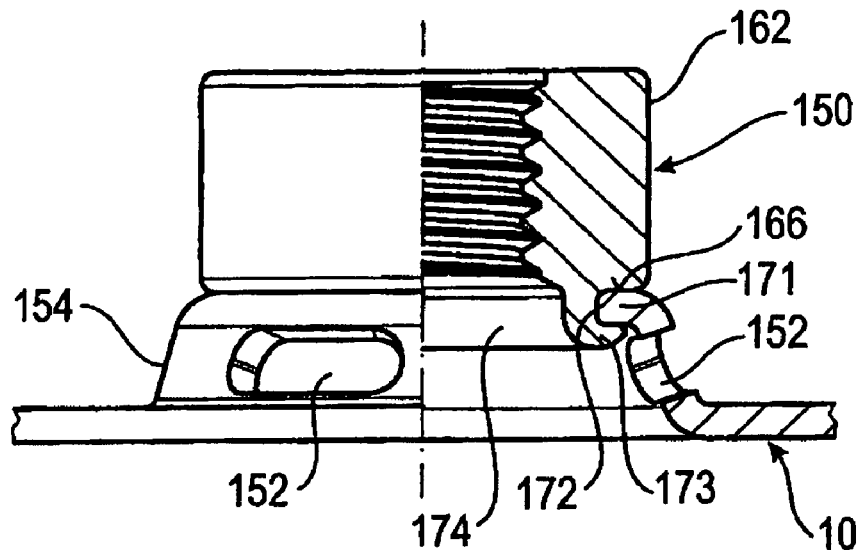
Figure 14H:
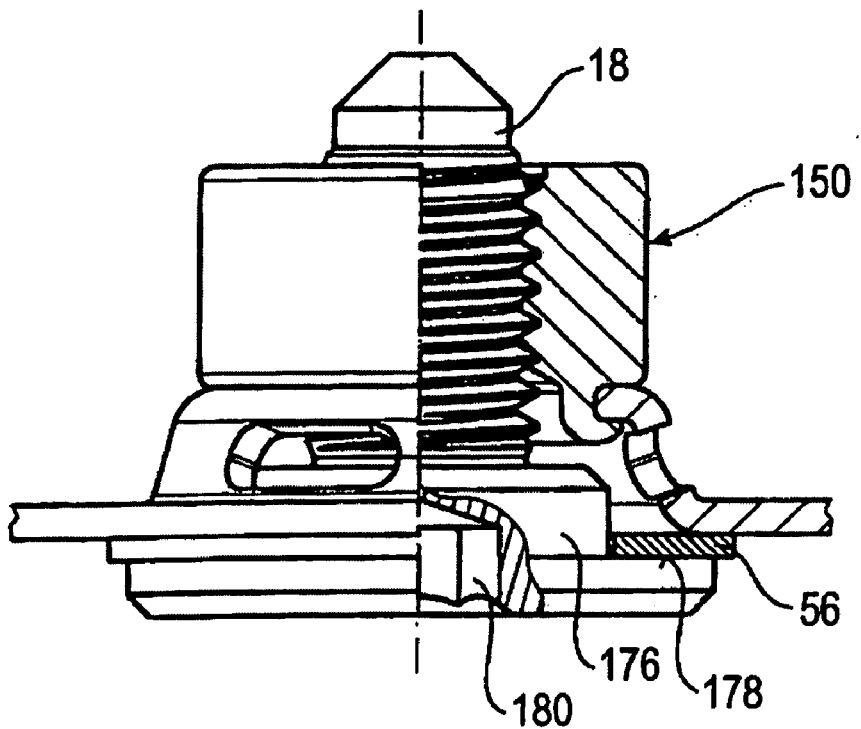

The sheet metal part 10 is pre-pierced in this example as shown in FIG. 13A. FIG. 13B is then a plan view onto the hole of the sheet metal part and it is evident from this that the hole has three inwardly projecting sections 132 which follow an imaginary inner circle 134 at their radially inner ends and, between the three radially inner projecting sections 132, three radially outwardly projecting sections 136 are provided which at their radially outer ends lie on or follow an imaginary circle 138 of larger diameter.

After the pre-piercing of the sheet metal part in accordance with FIGS. 13A and 13B, or simultaneously with the pre-piercing, the radially inwardly projecting sections 132 are bend upwardly in order to form bent sections 132'. As is evident from FIG. 13D the element is then inserted with its cylindrical rivet section 112 to the fore into the pre-pierced sheet metal part 10 so that he upwardly projecting regions come to lie in the ring groove. By means of a suitable die button (not shown), which can however have the same shape as the customary RND die buttons, the sheet metal part is deformed in the region of the bent up sections 132' of the radially inwardly projection sections 132 and the rivet section 112 is simultaneously deformed into a radially outwardly directed rivet bead 140, with a recess for the radially upwardly bend regions 132' or radially inwardly projecting sections 132 being formed between the radially outwardly bent rivet bead 140 and the ring-like groove 122. In this way the element is held in a manner secure against press-out at the sheet metal part. At the same time the ribs providing security against rotation dig into the upwardly bend regions 132' of the radially inwardly projection sections 132 of the sheet metal part and form an excellent security against rotation for the element.

Figure 13E:
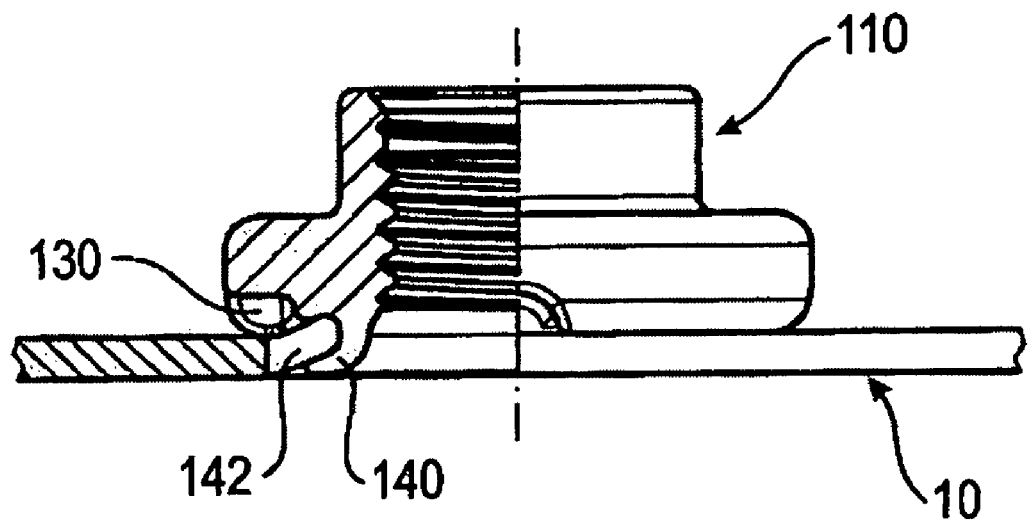
Figure 13F:
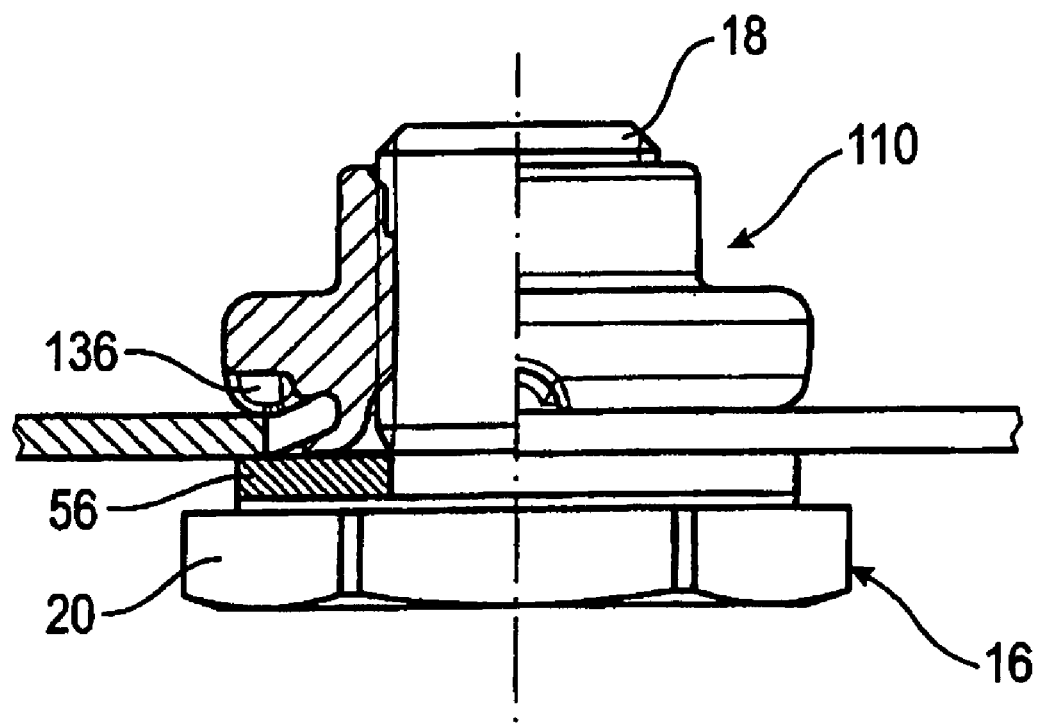

As evident from FIG. 13E the radially inwardly extending grooves 130 and the corresponding radially outwardly projecting sections 136 of the pierced sheet metal part 10 form a path 142 through which oil can flow away. It is particularly favourable with this embodiment that this path extends directly from the upper side of the sheet metal part 10 to the lower side of the sheet metal part so that the possibility exists of draining as much oil as possible from the oil pan, i.e. the residual oil volume can be kept very small or equal to zero.

At this point it should be mentioned that it is in no way necessary to provide four such grooves, rather one could operate with another number of radially extending grooves, for example one, two, three, five or more such grooves. The four grooves shown here extending radially are however preferred. It is favourable when, as shown, a different number of radially extending grooves 130 in the element and of the radial cut-outs 136 in the sheet metal part is provided (in this example four grooves 130 and three cut-outs 136) one can ensure in this manner that at least one radially extending groove at least partly aligns with at least one radial cut-out 136 and indeed independently of the actual rotational orientation of the element. I.e. it is not necessary to ensure a special rotational orientation of the element 110 about its central longitudinal axis 128.

The oil drain screw 16 could also be provided here with a central recess in the head part 20 to receive a suitable turning tool.

Finally, reference is made to FIGS. 14A to 14H.

These Figures show the use of a so-called RSN element 150 which is described in detail in the European patent 539 793, there in conjunction with the so-called clamping hole riveting process which is however not used here or does not have to be used here.

FIG. 14A first shows the sheet metal part 10 which is provided with three elongate openings 152 by means of a suitable stamping process. Thereafter the sheet metal part 10 is deformed in accordance with FIG. 14B to a dome-shaped approximately hemispherical raised portion or recess 154 in the region of the three elongate holes so that the three elongate holes extend arcuately and uniformly distributed around the periphery of the dome-like raised portion 154, as is evident from the lower part of FIG. 14B. Here, as also in FIG. 14A, one can actually only see one and a half of the total of the three holes.

The formation of the dome-like raised portion in accordance with FIG. 14B is produced with a correspondingly designed die button and with a correspondingly shaped stamp in a sheet metal forming tool, i.e. in a press or in a station of a progressive tool.

Thereafter, the sheet metal part 10 is flattened by means of another die button and another punch at the centre 156 of the dome-like raised portion 154 so that the sheet metal part now adopts the shape in accordance with FIG. 14C. Under some circumstances it can be possible to transform the sheet metal part in accordance with FIG. 14A directly into the shape in accordance with FIG. 14C, i.e. without the intermediate stage of forming the dome-like shape.

In a further stage, which is shown in FIG. 14D, the central region 156 of the recess 154 which has been produced by the flattening of the dome-like raised portion is pierced in order to generate a circular mount 158 here which receives the cylindrical rivet section 160 of the RSN element 150 in accordance with FIG. 14E. One can see from FIG. 14E that the RSN element 150 has a body part 162 with a threaded bore 164 and that the cylindrical rivet section 160 merges via a ring-like sheet metal contact surface 166 into the outer peripheral surface of the element. One also notes that the threaded bore 164 has a maximum diameter which is smaller than the inner diameter of the rivet section 160. In the region between the cylindrical rivet section 160 and the body part 162 of the element there are located a plurality of obliquely placed noses 168 providing security against rotation which, so to say, bridge the corners 170 between the ring-like contact surface 166 and the cylindrical outer surface of the rivet section 160 in triangular manner.

The outer diameter of the cylindrical rivet section 160 corresponds at least substantially to the diameter of the hole 158 in the base surface of the recess 154 so that the rivet section can be passed through this hole. Thereafter the element is pressed by means of a setting head against a correspondingly designed die button which forms the cylindrical rivet section into the rivet bead and also ensures that the ribs providing security against rotation dig into the sheet metal material. The result can be seen in FIG. 14F. Here the rim region 171 of the hole 158 is held in the base region of the recess 154 in a mount which is of U-shape in section between the beaded over region 173 of the rivet section and the ring-like contact surface 166. The element is therefore connected to the sheet metal part in a manner secure against press-out. Since the noses 168 providing security against rotation have dug into the sheet metal part the element is also held at the sheet metal part in the manner secure against rotation.

FIG. 14G shows the same construction as the FIG. 14F but to an enlarged scale. One notes that oil can flow away through the holes 152 of the inner space 174 of the recess and indeed in such a way that the residual volume can be kept extremely small because the lower boundary of the holes 152 is at least substantially aligned with the surface of the sheet metal part 10 outside of the recess 154.

The overall situation with a screwed-in oil drain screw 16 is then as shown in FIG. 14H. Here the thread of the shaft part 18 of the oil drain screw 16 engages in the threaded bore 164 of the element 150. Here also a ring seal 56 is provided between the head part 20 of the oil drains screw 16 which is of significantly larger diameter than the shaft part 18 and the lower side of the sheet metal part 10 radially outside of the recess 154. The sealing ring is centred here by a cylindrical collar 176 of the oil drain screw 16 in the region between the contact surface 178 of the head part 20 of the screw 16 and the shaft part 18. In this embodiment the oil drain screw 16 is preferably provided with a recess for a tool in the form of an internal hexagon 180. Other shapes for the tool mount 180 can also be provided. The head part of the screw could then also, if required, be provided with an external hexagon or with another design for the form-fitted reception of a corresponding tool. One notes that in the embodiment in accordance with FIG. 14H oil which is located in the oil pan has not been able to flow outwardly because it cannot get passed the ring seal. On removing the oil drain screw oil can however flow substantially without leaving a remainder out of the oil pan and indeed through the openings in the hollow cylindrical inner space of the recess and from there further outwardly.

At this point it should also be mentioned that it is in no way necessary to provided three elongate openings. There could be more openings or fewer than three openings and the elongate openings could ultimately also be replaced by cylindrical bores or cylindrical passages which do not have to be produced by drilling. The embodiment in accordance with FIG. 14 is favourable because, on the one hand, it ensures substantially the entire oil can flow away and, on the other hand, the constructional height of the head part 20 of the oil drain screw 16 outside of the recess 154, i.e. beneath the sheet metal part 10, can be kept extremely small. This is partly possible because the cylindrical collar 176 of the head part of the oil drain screw 16 can be received in the recess 154 itself, so that the required depth for the internal hexagon, i.e. for the tool mount 180 which is located partly in the cylindrical collar 176, is so to say recessed within the sheet metal part or lies within the recess 154, whereby constructional height is saved.

Thus the component assembly can be such that the nut element (10) is a rectangular element in plan view in the form of a press-in element. Alternatively the nut element can be a rectangular element in plan view having a cylindrical rivet section at one end face.

In another alternative the nut element can be a fastener element 60; 110; 150 with a circular outline in the form of a press-in element (60) or in the form of a rivet element 110; 150.

The sheet metal part 10 is preferably an oil pan 50.

The oil drain hole 152 or holes in the sheet metal part can have an elongate shape.

In a component assembly using an RSU-type element in a accordance with claim 14 a peripherally extending recess, in particular a recess which is approximately semi-circular in cross-section, can be provided in the ring-like contact surface with the peripherally extending recess preferably being wave-shaped in a plan view.

In an embodiment in accordance with claim 14 a plurality of preferably mutually spaced-apart recesses 70 can be provided in the ring-like contact surface 64 for the provision of security against rotation.

Moreover, raised features can be provided at the sidewall of the recess which form the undercuts 68 and indeed at peripheral positions which correspond to the recesses 70 in the ring-like contact surface.

In an alternative design of the kind generally described in claim 14 a peripherally extending recess, in particular a recess which is approximately semi-circular in cross-section is provided in the ring-like contact surface with the peripherally extending recess preferably being wave-shaped in plan view.

When it is stated wherein the hole 40 or the holes is or are arranged adjacent to the opening 14 of the sheet metal part 12 it will be understood that the hole can be separated from the opening by a web of sheet metal material. Alternatively the hole can merge into the opening. That is to say the opening is shaped to receive the press in part or rivet section of the nut element and the hole has a boundary which lies outside of the so shaped opening and an open boundary coincident with part of the periphery of the of the so shaped opening.

The invention claimed is:

1. A component assembly comprising a sheet metal part (10) and a nut element (12) attached thereto, the nut element being arranged concentric to an opening (14) of the sheet metal part (10) and being adapted to receive a bolt element (16) having a shaft part (18) with a thread and a head part (20) adapted to seal against an underside of said sheet metal part, wherein the nut element (110) is provided with a cylindrical rivet section (112), a flange section (114) which projects radially away from the cylindrical rivet section (112) generally perpendicular to the latter and with a fastener section (118) which lies generally opposite to the cylindrical rivet section (112), with the flange section (114) including an outer annular or annular sheet metal contact surface (120), wherein an annular groove (122) is provided adjacent to the cylindrical rivet section (112) and surrounds the cylindrical rivet section (112) radially inside the outer annular sheet metal contact surface; wherein a plurality of spaced-apart radial ribs (124) cross or bridge the groove (122); wherein the fastener section (118) includes a bore having a thread (126) which is coaxially directed relative to the cylindrical rivet section (112) and wherein one or a plurality of oil drain grooves (130) extending in the radial direction interrupt the annular sheet metal contact surface; wherein the opening of the sheet metal part has a rim with alternately radially inwardly projecting sections (132) and radially outwardly projecting cut-outs (136) with the radially inwardly projecting sections (132) being bent upwardly and being clamped between the rivet bead (140) formed from the cylindrical rivet section (112) and the base of the annular groove and wherein at least one of the radially extending grooves (130) is aligned with one of the radially outwardly facing sections (136) in order to allow oil to flow from the surface of the sheet metal part (10) through this groove and through the opening of the sheet metal part, i.e. through the radially outwardly facing cut-outs (136).

2. The component assembly in accordance with claim 1, wherein the number of the radially outwardly projecting cut-outs (136) of the hole rim differs from the number of the grooves (130) extending in the radial direction so that an oil drain path (142) is always present through at least one of the oil drain grooves independently of the respective position of the nut element (110) around its longitudinal axis (128).

* * * * *